(12) United States Patent
Kremsler et al.

(10) Patent No.: US 7,685,673 B2
(45) Date of Patent: Mar. 30, 2010

(54) MANUALLY GUIDED BLOWER

(75) Inventors: Dieter Kremsler, Spiegelberg (DE); Roman Dawen, Prüm (DE); Klaus Langhans, Winnenden (DE); Manfred Rabis, Schwaikheim (DE); Kirsten Schellin, Schorndorf (DE)

(73) Assignee: Andreas Stihl AG & Co. KG (DE)

( * ) Notice: Subject to any disclaimer, the term of this patent is extended or adjusted under 35 U.S.C. 154(b) by 86 days.

(21) Appl. No.: 11/950,893

(22) Filed: Dec. 5, 2007

(65) Prior Publication Data

US 2008/0127448 A1 Jun. 5, 2008

(30) Foreign Application Priority Data

Dec. 5, 2006 (DE) .......................... 10 2006 057 184

(51) Int. Cl.
*A47L 5/00* (2006.01)

(52) U.S. Cl. .............................. 15/405; 15/319; 15/330

(58) Field of Classification Search ................... 15/319, 15/330, 405
See application file for complete search history.

(56) References Cited

U.S. PATENT DOCUMENTS

| 5,711,048 A * | 1/1998 | Pink et al. ...................... 15/347 |
| 6,442,790 B1 * | 9/2002 | Svoboda et al. ............... 15/330 |

* cited by examiner

*Primary Examiner*—Joseph J Hail, III
*Assistant Examiner*—Shantese McDonald
(74) *Attorney, Agent, or Firm*—Robert W. Becker; Robert Becker & Assoc.

(57) ABSTRACT

A manually guided blower having a housing in which is disposed a drive motor that rotatingly drives an impeller. The impeller draws in an air stream via an intake opening and conveys the air stream through a discharge opening of the housing. The blower has at least one attachment that can be detachably connected to the housing in the region of one of the openings. The blower has at least one switch that is actuated when the attachment is secured to the opening, whereby the drive motor is in a ready-to-operate state only when the switch is actuated.

19 Claims, 7 Drawing Sheets

MANUALLY GUIDED BLOWER

The instant application should be granted the priority date of 5 Dec. 2006, the filing date of the corresponding German patent application DE 10 2006 057 184.3.

BACKGROUND OF THE INVENTION

The present invention relates to a manually guided or portable blower.

U.S. Pat. No. 6,442,790 discloses a blower having an intake opening and a discharge opening. An intake grille or a suction tube can be secured to the intake opening, and a discharge tube or a collection bag can be disposed at the discharge opening. Thus, the blower can be used both in blower operation as well in suction operation, for example to collect yard material such as leaves or the like. The blower known from U.S. Pat. No. 6,442,790 is operated with an electric motor. The intake grille or the suction tube is attached to the discharge tube and is fixed on the housing. A switch is provided that is actuated by the installed intake grille. In order to be able to exchange the attachment at the discharge opening, the intake grille must also be removed.

It is known to drive manually guided blowers with an internal combustion engine. To prevent an unintentional release of the intake grille, the intake grille of blowers driven by an internal combustion engine are customarily fixed in place by screws or bolts. The exchange or replacement of the attachment is therefore complicated. Such blowers can customarily also be operated without an attachment disposed at the discharge opening.

It is an object of the present invention to provide a manually guided blower that enables a reliable operation and with which the exchange of attachments can be effected in a straightforward manner.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
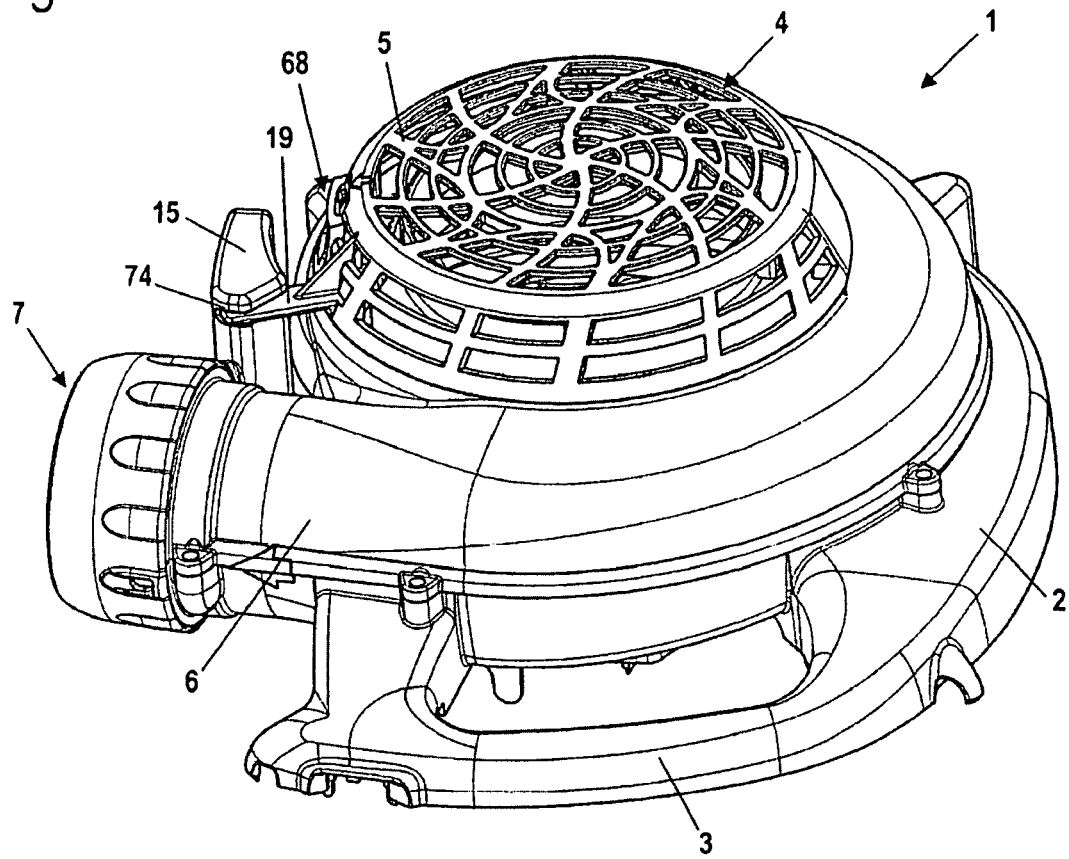
FIG. 1 is a perspective illustration of a blower.

The manually guided blower of the present application comprises a housing in which is disposed a drive motor that rotatingly drives an impeller, wherein the impeller draws in an air stream via an intake opening and conveys the air stream through a discharge opening of the housing, whereby the blower has at least one component or attachment that can be releasably or detachably connected to the housing in the region of one of the openings, wherein the blower furthermore comprises at least one switch that is actuated when the attachment is secured to the opening, whereby the drive motor is in a ready-to-operate state only when the switch is actuated.

A switch is advantageously provided for the component or attachment at the discharge opening. As a result, operation without an attachment at the discharge opening is not possible. The attachment at the discharge opening can be exchanged or replaced without also having to remove or disassemble an attachment at the intake opening. This facilitates handling and conversion.

The blower advantageously has at least one attachment that can be detachably connected to the housing in the vicinity of the intake opening. In particular, the blower is provided with a switch that is actuated when the attachment is secured to the intake opening, whereby the drive motor is ready-to-operate only when the second switch is actuated. The blower thus has separate switches for the attachments at the intake opening and at the discharge opening, with these switches being adapted to be actuated independently of one another. Only when attachments are mounted in a correct manner at both openings are the switches actuated and the blower is ready to operate. In this connection, the switches are actuated only if the attachment is correctly held, so that operation is also not possible when the attachments are incorrectly fixed.

The drive motor is advantageously an internal combustion engine. Due to the fact that also with a blower operated with an internal combustion engine there is provided at least one of the openings of the intake opening and the discharge opening a switch that is actuated when an attachment is secured to the opening, an unintentional reaching of the user into an opening can be prevented during operation. Since the internal combustion engine is ready-to-operate only when the attachment is correctly fixed, a simple to release connection, for example a bayonet closure or the like, can also be used for fixing the attachment in position. If the connection is inadvertently released, the internal combustion engine is not ready to operate, so that there is no danger for the user.

Pursuant to one specific embodiment, a first switch can be disposed at the discharge opening and a second switch can be disposed at the intake opening. In this way, the intake opening and the discharge opening are secured independently of one another via separate switches. Only when not only the attachment at the discharge opening but also the attachment at the intake opening is respectively secured is the blower ready to operate.

A straightforward construction of the blower results if the first switch and the second switch are integrated at a common switch element having two switch contacts. The first switch and the second switch are advantageously opened in the actuated state. The first switch and the second switch are advantageously connected in parallel, in particular when the drive motor is an internal combustion engine.

The drive motor is expediently an external, auto-ignition internal combustion engine having an ignition device, whereby at least one switch in the closed state connects the ignition device with a ground wire. When the switch is closed, in other words not actuated, ignition of the internal combustion engine is short circuited. As a result, an ignition of the mixture in the combustion chamber of the internal combustion engine is not possible. When the ignition is short circuited, the internal combustion engine cannot be started. A parallel connection of the two switches ensures that ignition of the internal combustion engine is possible only when both of the switches are open, in other words, are actuated.

However, the first and the second switches can also be connected in series. This is in particular advantageous when the drive motor is an electric motor. In this connection, the switches are in particular connected in series with the power source of the drive motor and with the drive motor, so that the drive motor can then be ready-to-operate only when both of the switches are closed.

A straightforward construction of a switch is provided if at least one switch has a contact plate and a torsion spring that cooperates with the contact plate. A single or common torsion spring is advantageously provided for two switches, whereby the torsion spring has a first leg and a second leg, and whereby the first leg along with the contact plate forms the first switch and the second leg along with the contact plate forms the second switch. To form two switches it is thereby necessary to have only one torsion spring and one contact plate. This results in a straightforward construction. The number of components required is low. However, it would also be possible to provide two torsion springs, whereby the first torsion spring along with the contact plate forms the first switch, and the second torsion spring along with the contact plate forms the second switch. Two individual torsion springs can be indisposed independently of one another, so that the arrangement of the switches on the blower can be freely selected.

To prevent an unintentional actuation of a switch or an undefined switch condition, at least one torsion spring can be biased into the closed state of the switch.

At least one switch can be a micro switch. Micro switches require very little installation space and have a robust construction, thus resulting in a small overall size and a long service life for the blower.

For the blowing operation, one attachment for the intake opening is an intake grille and one component for the discharge opening is a discharge tube. For the suction operation, in particular one attachment for the intake opening is a suction tube and one attachment for the discharge opening is a withdrawal or exhaust tube. In this connection, the withdrawal tube opens in particular into a collection bag.

At least one attachment can be connected to the housing via a rotation of a securement element of the attachment about an axis of rotation that extends transverse to the opening. The securement element of the attachment can be monolithically formed with the attachment and can, for example, be provided with a thread or elements of a bayonet closure. The attachment advantageously has an actuating element for the actuation of the switch. The actuating element is advantageously an actuating arm that in particular extends outwardly relative to the axis of rotation; the actuating arm actuates the switch when the attachment is secured to the opening. As a result, in a straightforward manner it is possible to achieve actuation of the switch when the attachment is secured to the opening. A straightforward configuration is provided if both of the switches are disposed in a single or common switch housing, and the switch housing has a support, on which the switches are held, as well as a cover, which is connected with the support via at least one latching or snap mechanism. This results in a simple, compact construction. The switches can also be provided on existing blowers at a later stage.

Further specific features of the present invention will be described in detail subsequently.

DESCRIPTION OF SPECIFIC EMBODIMENTS

Referring now to the drawings in detail, the blower 1 shown in FIG. 1 has a housing 2 to which is secured a first handle 3. The blower 1 has a blower spiral or volute 6 that conveys an air stream through a discharge opening 7. The air stream is drawn in via an intake opening 4, which is covered by an intake grille 5.

Figure 2:
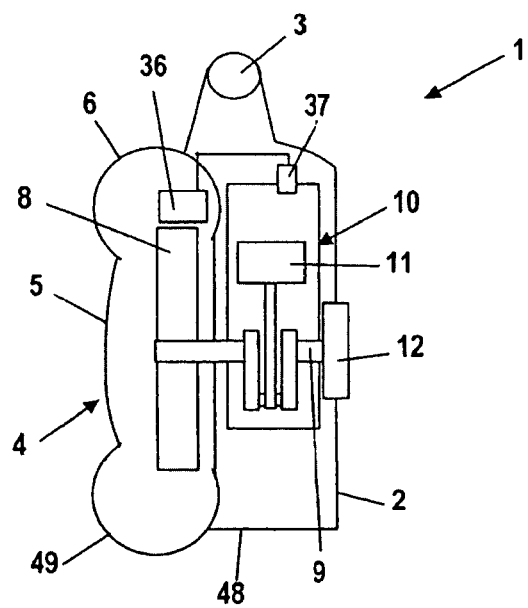
FIG. 2 is a cross-sectional view through a blower.

FIG. 2 schematically shows the construction of the blower 1. The housing 2 includes an engine housing 48, in which is disposed an internal combustion engine 10, as well as a blower housing 49, which includes the blower spiral 6. The internal combustion engine 10 has a piston 11 that rotatably drives a crankshaft 9. A schematically illustrated starter device 12 is provided for starting the internal combustion engine 10. The crankshaft 9 extends into the blower housing 49. Disposed at that end of the crankshaft 9 that extends into the blower housing 49 is an impeller 8 that draws the air stream in via the intake opening 4 and conveys the air stream through the blower spiral 6 to the discharge opening 7. The internal combustion engine 10 is an external, auto-ignition two-cycle engine, although it could also be an external, auto-ignition four-cycle engine. Disposed in the region of the outer periphery of the impeller 8 is an ignition module 36 in which a voltage is induced via non-illustrated magnets that are disposed on the periphery of the impeller 8. The ignition module 36 is connected with a spark plug 37 of the internal combustion engine and provides the energy for the ignition of the mixture in the combustion chamber of the internal combustion engine 10.

As shown in FIG. 1, the intake grille 5 is held on the intake opening 4, for example by means of a non-illustrated bayonet closure. Provided adjacent to the discharge opening 7 is a fixing means 68, which can, for example, be embodied as a snap-type closure. By means of the fixing means 68, the intake grille 5 can be secured to the intake opening 4. Adjacent to the fixing means 68 the intake grille 5 has an outwardly extending actuating arm 19 that, when the intake grille 5 is secured to the intake opening 4, extends into a slot 74 of a switch or switch mechanism housing 15. To loosen the intake grille 5 and to pivot it out of the way, the fixing means 68 is released. Instead of being held by the fixing means 68, the intake grille 5 can also be held on the intake opening 4 in an arresting position.

Figure 3:
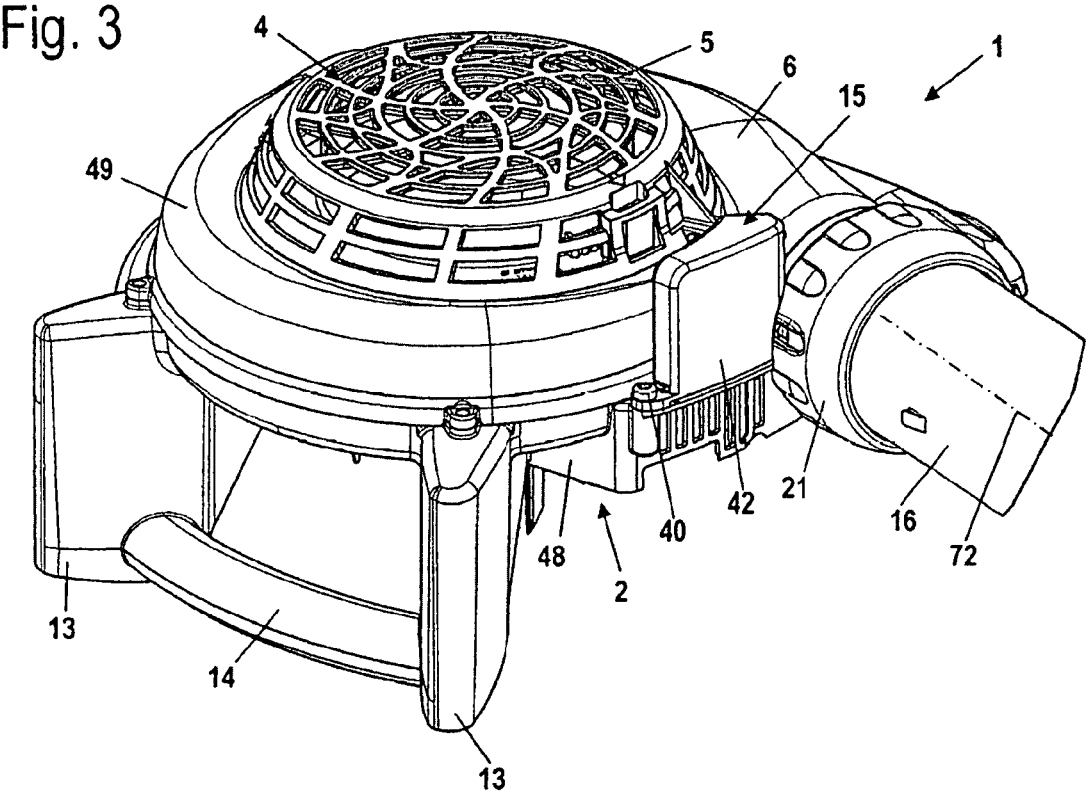
FIG. 3 is a perspective illustration of the blower of FIG. 1 in blowing operation.

As shown in FIG. 3, the switch housing 15 is secured to the engine housing 48 of the blower 1. A second handle 14 is provided on the housing 2 opposite to the first handle 3. The second handle 14 extends between two bases 13, on which the blower 1 can be placed or supported during a blowing operation. During a blowing operation, the blower 1 is held by the first handle 3 and the second handle 14 extends downwardly in the direction of the ground. During a suction operation, the operator holds the blower 1 not only by the first handle 3 but also by the second handle 14. The intake opening 4 faces downwardly.

In FIG. 3 the blower 1 is shown in a blowing operation. The intake grille 5 is secured to the intake opening 4. Secured to the discharge opening 7 is a blower or discharge tube 16, which is fixed to the discharge opening 7 (FIG. 1) of the blower spiral 6 via a coupling nut 21. To fix the discharge tube 16, the coupling nut 21 is rotated about an axis of rotation 72 that is disposed transverse to the discharge opening 7 and in particular corresponds to the longitudinal center line of the discharge tube 16 in the region of the discharge opening 7. The coupling nut 21 is provided, for example, with a thread, thread portions, or elements of a bayonet closure for the connection with the housing 2. However, it can also be possible for the fixation of the discharge tube 16 that the entire discharge tube be rotated about the axis of rotation 72 and that the discharge tube 16 itself be provided with elements, such as a thread or the like, for the connection to the housing 2.

Figure 4:
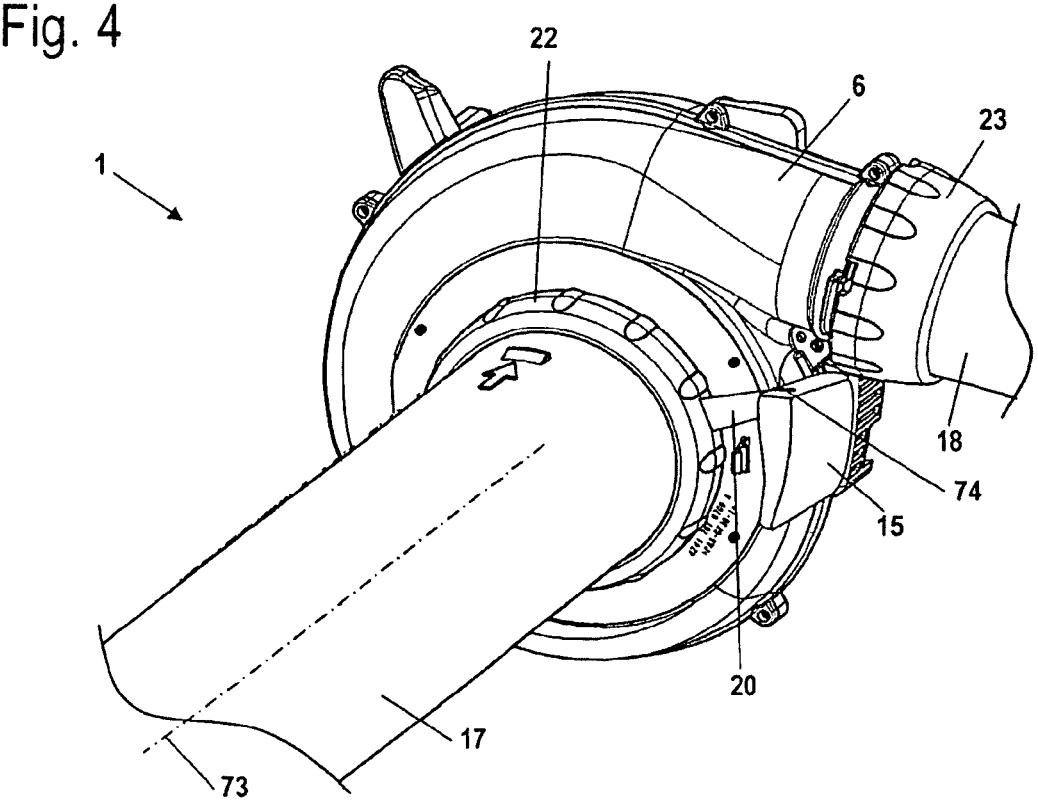
FIG. 4 is a perspective illustration of a blower in vacuum or suction operation.

FIG. 4 shows the blower 1 in a suction operation. The handles 3 and 14 are not shown in FIG. 4. In a suction operation, the intake grille 5 is removed from the intake opening 4, and a suction tube 17 is secured to the intake opening 4 via a coupling nut 22. For the fixation of the suction tube 17, the suction tube is disposed on the intake opening 4 and the coupling nut 22 is rotated about an axis of rotation 73 that extends transverse, and in particular perpendicular, to the intake opening 4. The coupling nut 22 is provided with elements for the connection with the housing 2, such as thread portions or the like. The axis of rotation 73 in particular coincides with the longitudinal center line of the suction tube 17. Secured to the coupling nut 22 is an actuating arm 20 that extends outwardly, in particular radially outwardly, from the coupling nut 22, relative to the axis of rotation 73. When the suction tube 17 is secured in position on the intake opening 4, the actuating arm 20 extends into the slot 74 of the switch or switch mechanism housing 15. A withdrawal or exhaust tube 18 having a coupling nut 23 is secured to the discharge opening 7. The coupling nut 23 of the withdrawal tube 18 corresponds to the coupling nut 21 of the discharge tube 16.

Figure 5:
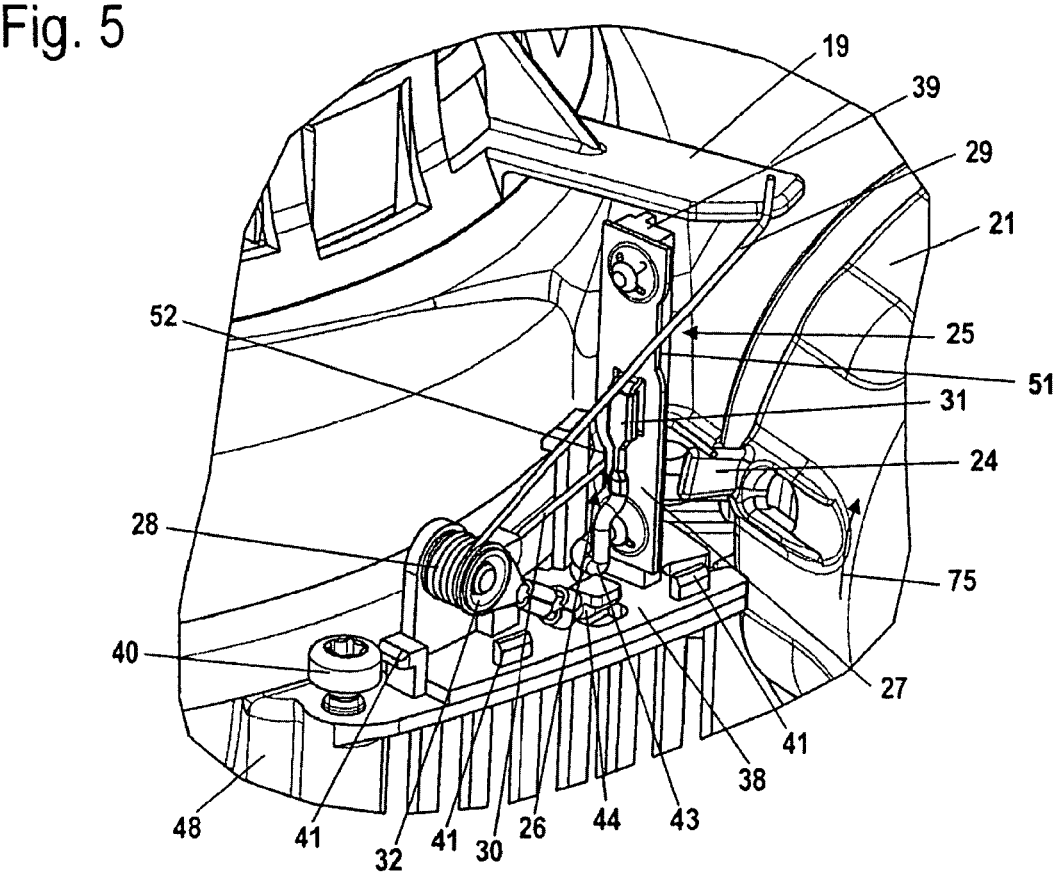
FIG. 5 is a perspective illustration of the switch of the blower.
Figure 6:
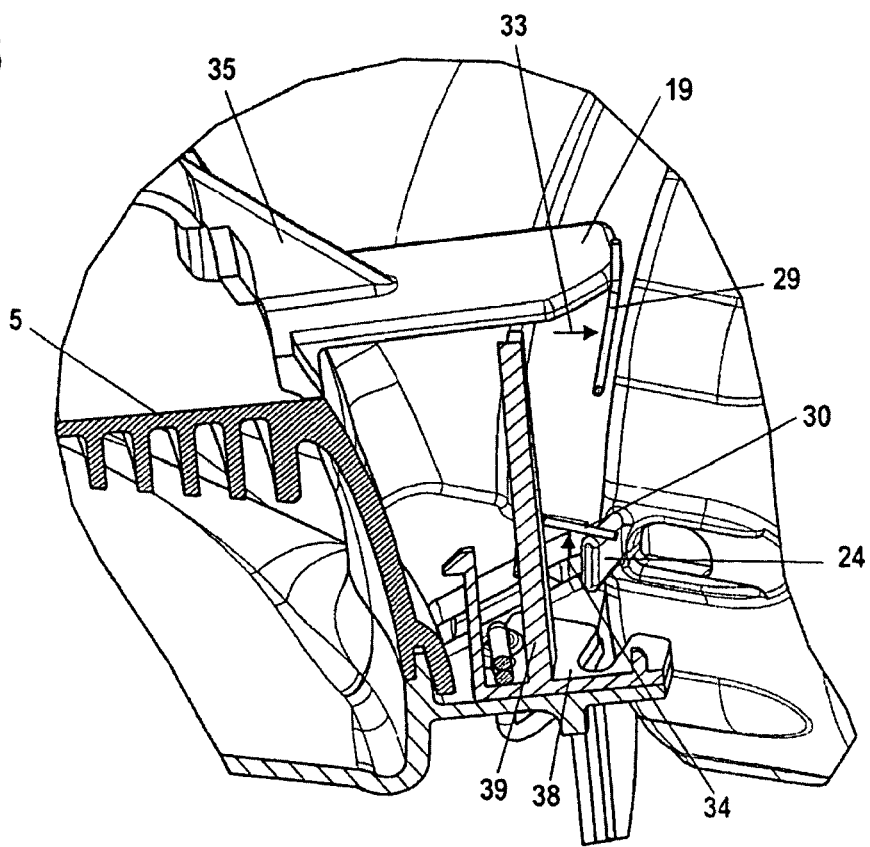
FIG. 6 is a cross-sectional view through the switch of FIG. 5.
Figure 7:
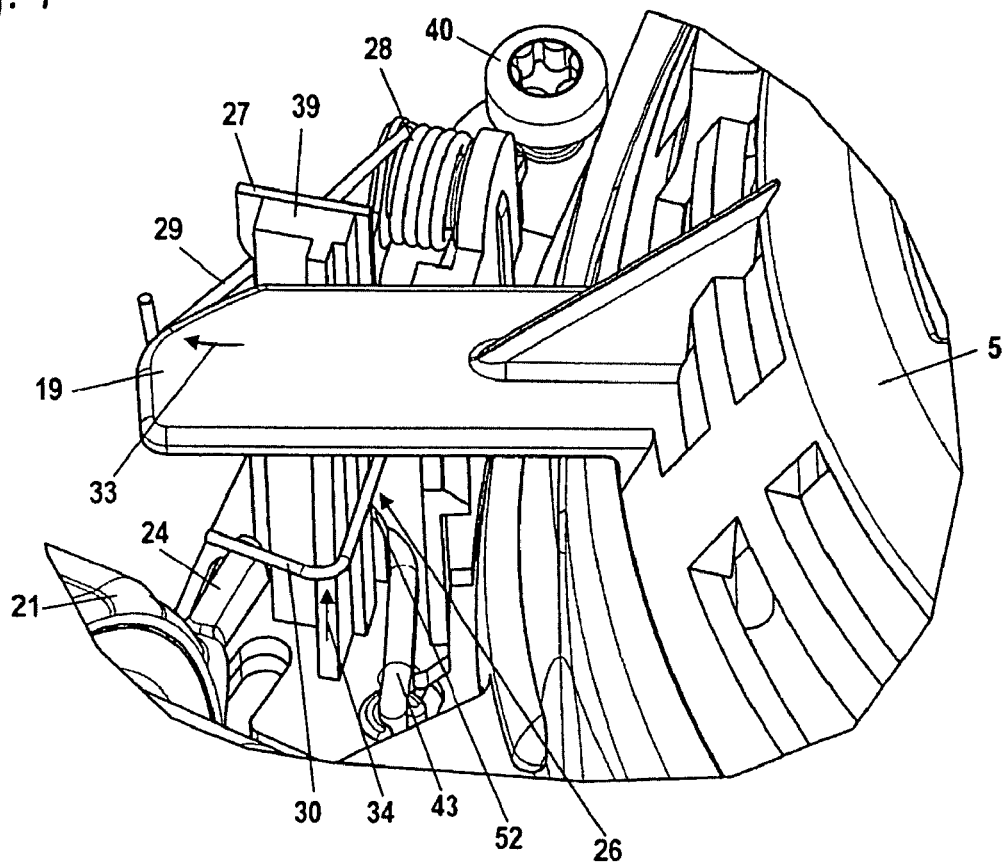
FIGS. 7 and 8 are perspective illustrations of the switches of FIG. 5.

The switch or switch mechanism housing 15 has the cover 42 shown in FIG. 3. In FIG. 5, the switch housing is shown with the cover 42 removed. The switch housing 15 has a support 38, which forms the base of the switch housing 15 and rests against the engine housing 48. The support 38 is provided with a plurality of latching hooks 41 that serve for the fixation of the cover 42. A first switch or switch mechanism 26, and a second switch or switch mechanism 25, are disposed in the switch housing 15. The first switch 26 is actuated by an actuating arm 24 of the coupling nut 21 of the discharge tube 16. The coupling nut 22 of the suction tube 17 has a similar actuating arm 20 (FIG. 4). The actuating arm 24 extends outwardly from the coupling nut 21, whereby the actuating arm 24, in particular relative to the axis of rotation 72 (FIG. 3), extends radially outwardly. For the fixation of the discharge tube 16, the coupling nut 21 is rotated in the direction of rotation 75 about the axis of rotation 72 shown in FIG. 3. In so doing, in FIG. 5 the actuating arm 24 moves upwardly and deflects a first leg 30 of a torsion spring 28. In FIGS. 6 and 7, the arrow 34 shows the direction in which the first leg 30 is deflected by the actuating arm 24. On the support 38, a contact plate 27 is secured to a mounting means 39. The contact plate 27 has a lateral recess 52 in which is disposed the first leg 30 of the torsion spring 28. In the non-actuated state, the first leg 30 rests against that edge of the lateral recess 52 of the contact plate 27 that in FIG. 5 is the lower edge. As a result, an electrical connection is established between the torsion spring 28 and the contact plate 27. The contact plate 27 is advantageously made of copper.

The torsion spring 28 has a second leg 29, which is guided along on the opposite side of the contact plate 27 and is disposed in a lateral recess 51 of the contact plate 27. As shown in FIGS. 6 and 7, the actuating arm 19 of the intake grill 5 deflects the second leg 29 of the torsion or contact spring 28 in the direction of the arrow 33 and presses is laterally away from the contact plate 27 when the intake grille 5 is fixed on the intake opening 4. In the non-actuated state, the second leg 29 rests against the contact plate 27. The second leg 29 is biased in the direction toward the contact plate 27. As shown in FIG. 6, the mounting means 39 of the contact plate 27 is monolithically formed with the support 38. A reinforcing rib 35 is disposed on the actuating arm 19.

Disposed on the contact plate 27 is a connection contact 31 (FIG. 5) that can be connected to the ignition module 36 of the internal combustion engine 10 via a connection cable 43. The torsion spring 28 is held on the bearing bolt 46 (shown in FIG. 8) on a mounting support 47, which is also monolithically formed with the support 38. The bearing bolt 46 advantageously extends approximately parallel or at a slight angle to the axis of rotation 72, and approximately parallel to the plane of the intake opening 4. Disposed on the bearing bolt 46 is a connection contact 32 that is connected to a connection cable 44. The connection cable 44 can, for example, be connected to the metallic cylinder or the metallic crankcase of the internal combustion engine 10. As shown in FIG. 3, the switch housing 15 is secured to the engine housing 48 via a mounting bolt 40. The two legs 29 and 30 of the torsion spring 28 are biased in the direction toward the contact plate 27. As soon as the intake grille 5 or the coupling nut 21 is loosened, the legs 29 and 30 of the torsion spring 28 move toward the contact plate 27 and establish an electrically conductive connection between the ignition module 36 and a ground wire. The connection cable 43 can also be connected with the ground connection of the internal combustion engine 10, and the connection cable 44 can be connected with the ignition module 36.

Figure 8:
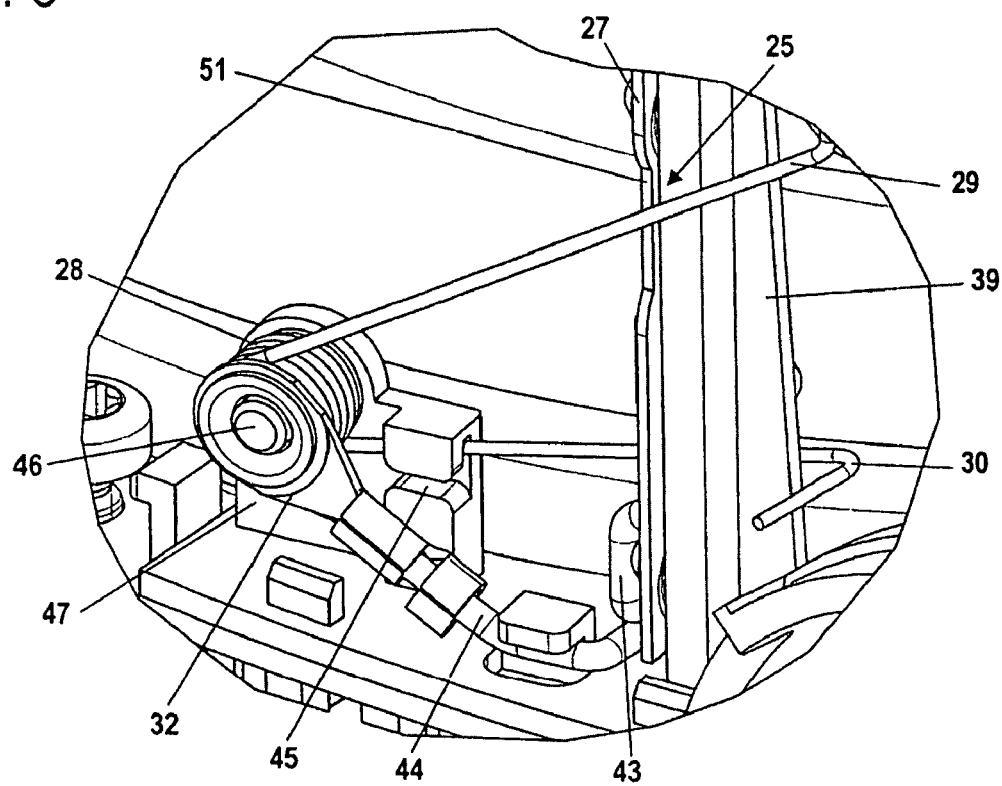

As shown in FIG. 8, the first leg 30 of the torsion spring 28 is guided in a guide means 45 formed on the mounting support 47. The guide means 45 delimits the deflection of the first leg 30 of the torsion spring 28 and ensures that the first leg 30 can be actuated by the actuating arm 24 and is not disposed beyond the range or reach of the actuating arm 24. At the same time, the guide means 45 ensures that in the non-actuated state the leg 30 rests against the contact plate 27 and cannot come to rest laterally next to the contact plate 27.

Figure 10:
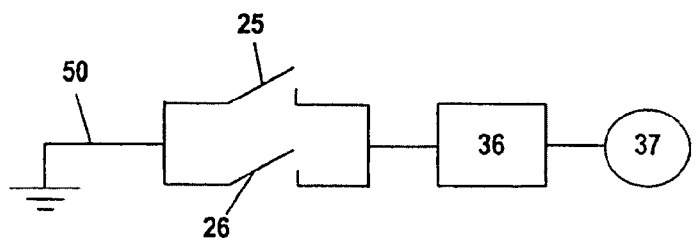
FIG. 10 schematically illustrates the circuit arrangement of the switches of the blower.

FIG. 10 shows the circuit arrangement of the two switches 25 and 26. The switches 25 and 26 are connected in parallel, and via a connection are connected to a ground wire 50 and with another connection are connected to the ignition module 36 and the spark plug 37.

Figure 9:
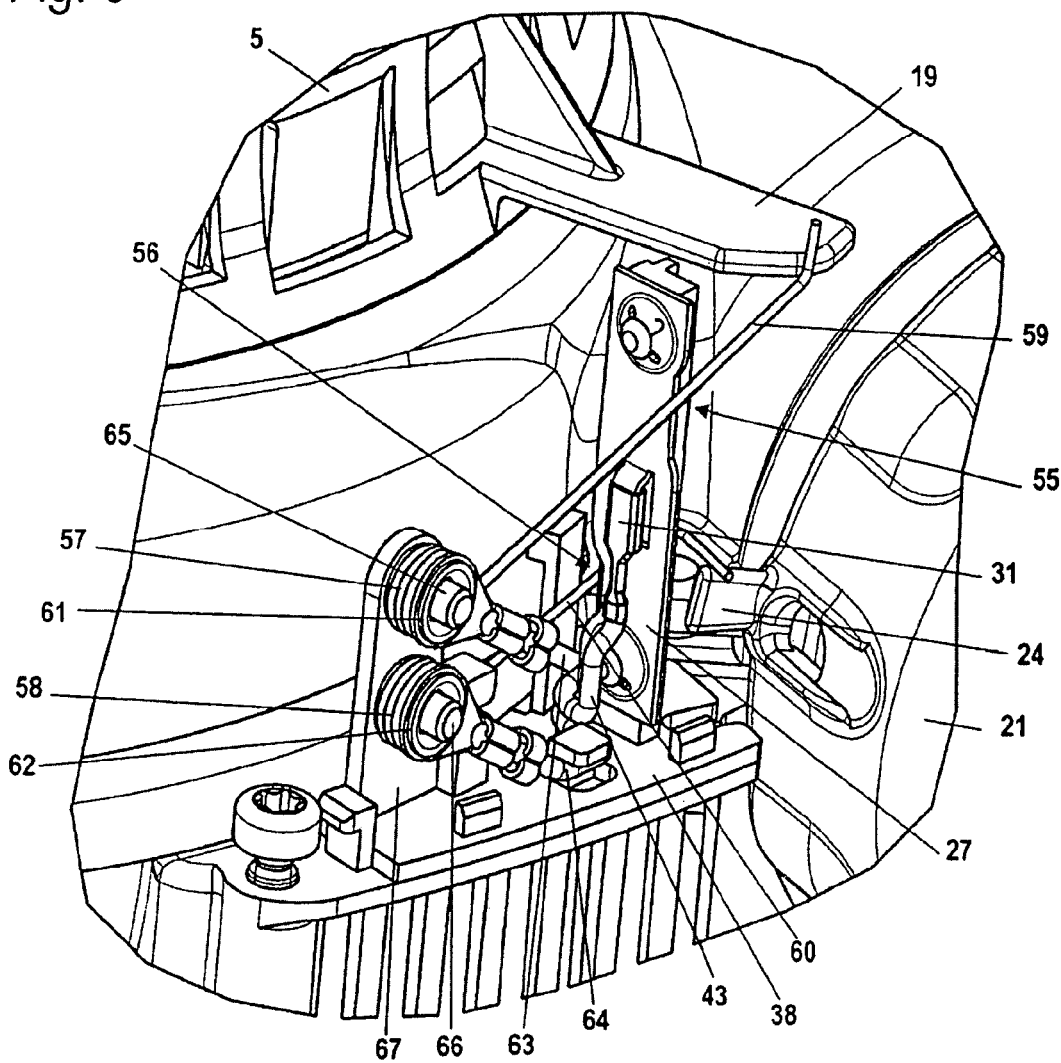
FIG. 9 shows an exemplary embodiment for the switches of the blower.

FIG. 9 shows an exemplary embodiment for first and second switches. A first switch 56 is formed between a leg 60 of a first torsion spring 58 and the contact plate 27. The same reference numerals designate the same components as in the first embodiment. The first torsion spring 58 is supported on a mounting support 67 on the support 38. For this purpose, a bearing bolt 66 is disposed on the mounting support 67. The first torsion spring 58 is electrically conductively connected with a connection cable 64 via a connection contact 62.

A second switch 55 is formed between a leg 59 of a second torsion spring 57 and the contact plate 27. The leg 59 of the second torsion spring 57 corresponds to the second leg 29 of the torsion spring 28 of the first embodiment. The leg 60 of the first torsion spring 58 corresponds to the first leg 30 of the torsion spring 28 of the first embodiment. The contact plate 27 has the identical configuration. The second torsion spring 57 is connected to the mounting support 67 via a bearing bolt 65, and is connected to a connection cable 63 via a connection contact 61. The connection cables 63 and 64 are respectively connected with the ground connection of the internal combustion engine 10 or with the ignition module 36. The two connection cables 63 and 64 can also be combined. The connection cable 43 of the connection contact 31 of the contact plate 27 is similarly guided either to the ignition module 36 or to the ground connection of the internal combustion engine 10.

Other configurations of the switches can also be expedient. In particular, micro switches can be used.

Figure 11:
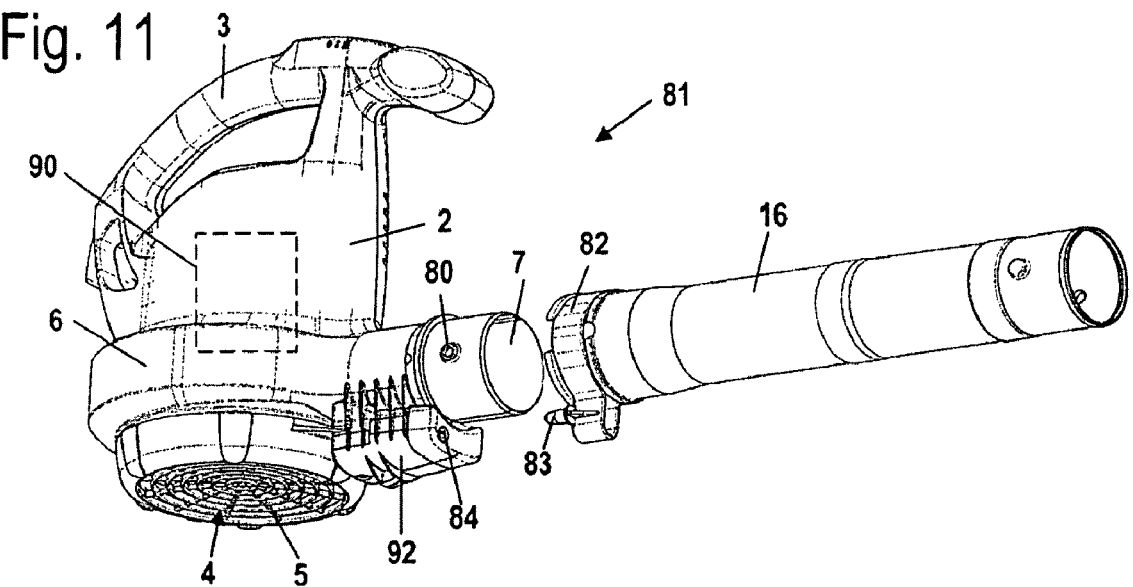
FIG. 11 is a perspective illustration of a blower.

FIGS. 11 to 14 show an exemplary embodiment of a blower 81 that is electrically operated. The same reference numerals as in FIGS. 1 to 10 indicate corresponding components and elements. In FIG. 11, an electric motor 90, which is shown only schematically, is disposed in the housing 2 of the blower 81. The electric motor 90 rotatingly drives an impeller 8, which is shown in FIG. 15, via a drive shaft 91. By means of an intake opening 4, which is covered by an intake grille 5, the impeller 8 draws in operating air and conveys this air via a blower spiral 6 into a discharge tube 16 disposed at a discharge opening 7. This construction, which is shown in FIG. 15, is also provided with the blower 81 of FIG. 11.

As shown in FIG. 11, the blower 81 has a handle 3 that is secured to the housing 2. The discharge tube 16 of the blower 81 is supported on the discharge opening 7 via a bayonet closure that cooperates with a raised portion 80 on the housing 2 of the blower. Rotatably held on the discharge tube 16 is a ring 82 that is provided with an actuating arm 83. In the installed state of the discharge tube 16, the actuating arm 83 extends into an opening 84 provided on the housing 2. The opening 84 is disposed on a switch housing 92.

Figure 12:
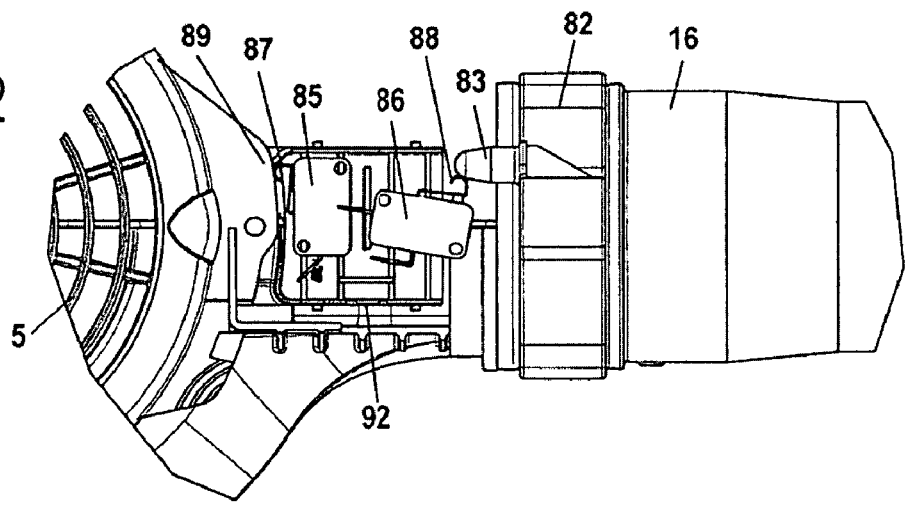
FIG. 12 is a side view of the switches of the blower of FIG. 11 with a first switch in a non-actuated state and a second switch in the actuated state.

As shown in FIG. 12, a first switch 86 and a second switch 85 are disposed in the switch housing 92, with these switches being embodied as micro switches. The switch 85 has an actuating member 87 that cooperates with an actuating arm 89 that is formed on the intake grille 5. In the closed position of the intake grille 5 shown in FIG. 12, the actuating arm 89 presses against the actuating member 87, thereby actuating the switch 85. In the actuated state, the switch 85 is closed. When the intake grille 5 is loosened or removed by rotating the intake grille about an axis of rotation disposed perpendicular to the intake opening 4, the actuating arm 89 is released from the actuating member 87 and the first switch 85 is opened.

The actuating arm 83 is embodied as a pin that in the not-completely installed position of the discharge tube 16 shown in FIG. 12 rests against an actuating member 88 of the switch 86, yet does not yet actuate this switch.

Figure 13:
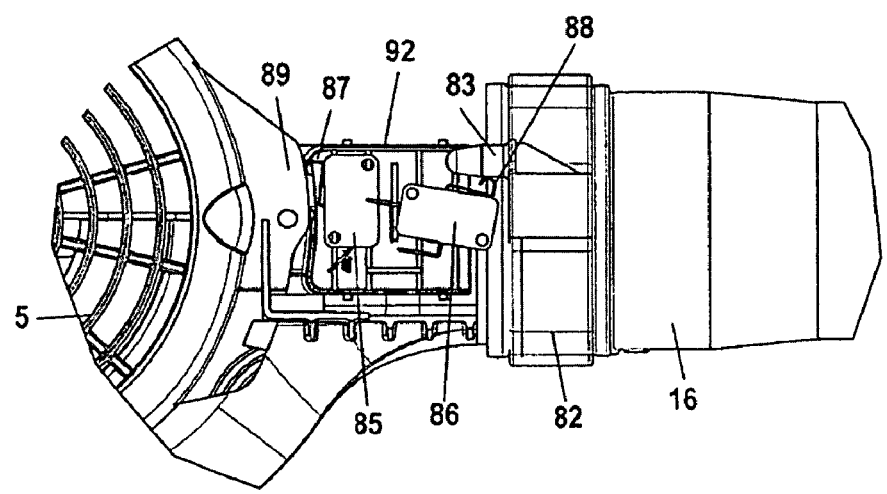
FIG. 13 is a view similar to FIG. 12 with two actuated switches.

FIG. 13 shows the installed position of the discharge tube 16. In this position, the actuating member 88 rests against a cylindrical portion of the actuating arm 83. The actuating member 88 is actuated by the actuating arm 83, thereby actuating the switch 86. In the actuated state, the switch 86 is closed.

Figure 14:
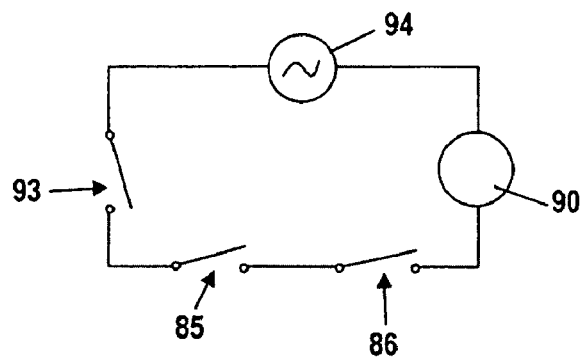
FIG. 14 is a schematic illustration of the circuit of the switches of the blower.
Figure 15:
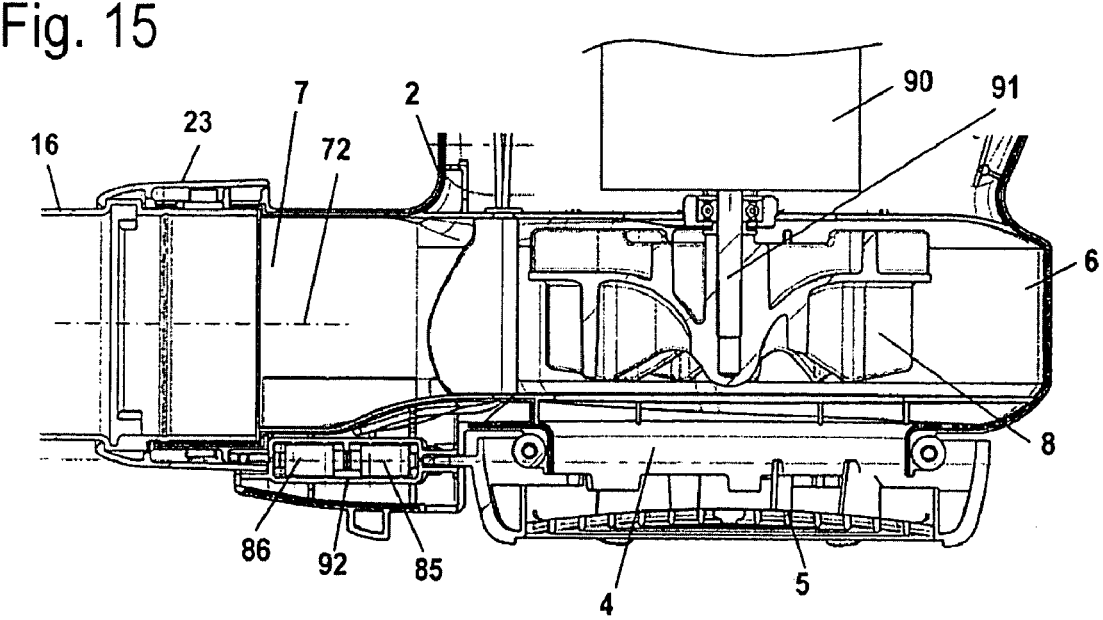
FIG. 15 is a partial cross-sectional illustration of an exemplary embodiment of a blower.

FIG. 14 shows the wiring or circuitry of the two switches 85 and 86. Both switches 85 and 86 are connected in series with one another and in series with the electric motor 90. Also connected in series for this purpose can be an actuation switch 93 that is embodied, for example, as a slider switch and that is provided on the upper handle 3 for actuation by the operator. The blower 81 is to be connected to a power source 94, for example to the main power supply. The power source 94 is also disposed in series to the electric motor 90 and to the switches 85 and 86.

As shown in FIG. 14, the electric motor 90 is ready to operate only if both switches 85 and 86 are closed, in other words, when not only the discharge tube 16 but also the intake grille 5 are installed. Instead of the discharge tube 16 and the intake grille 5, suction tubes could also be installed at both openings.

Figure 16:
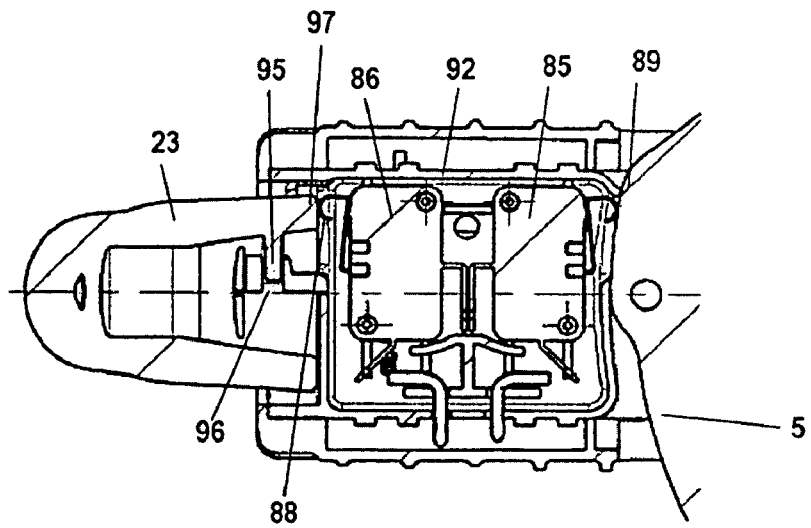
FIG. 16 shows the switches of the blower of FIG. 15 in the actuated state.

FIGS. 15 and 16 show an exemplary embodiment for the switches 85 and 86. The actuation of the switch 85 corresponds to the actuation shown in FIGS. 12 and 13 via an actuating arm 89. In the embodiment of FIGS. 16 and 17, the discharge tube 16 is secure to the housing 2 of the blower 81 via a coupling nut 23. For the fixation of the discharge tube 16, the coupling nut 23 is rotated about an axis of rotation 72 that is perpendicular to the discharge opening 7. In this connection, the discharge tube 16 need not be rotated. As shown in FIG. 16, the discharge tube 16 has an inwardly extending nose 95 that during fixation of the coupling nut 23 comes to rest in a receiving means 96 of the housing 2. Only in this position of the coupling nut 23 does a rim 97 of the coupling nut 23 that faces the housing 2 actuate the actuating member 88 of the second switch 86. This ensures that the second switch 86 can be actuated only when the discharge tube 16 is correctly installed. As a result, the electric motor 90 is ready for operation only if both of these switches 85 and 86 are actuated and accordingly a component or attachment is correctly installed at both openings 4 and 7.

The specification incorporates by reference the disclosure of German priority document DE 10 2006 057 184.3 filed 5 Dec. 2006.

The present invention is, of course, in no way restricted to the specific disclosure of the specification and drawings, but also encompasses any modifications within the scope of the appended claims.

What we claim is:

1. A manually guided blower, comprising:
   a housing in which is disposed a drive motor for rotatingly driving an impeller, wherein said impeller is adapted to draw in an air stream via an intake opening of said housing and is adapted to convey the air stream through a discharge opening of said housing;
   at least one attachment that is adapted to be detachably connected to said housing in the vicinity of one of said intake opening and said discharge opening; and
   two switches, wherein when said at least one attachment is secured to said one opening, at least one of said switches is actuated, further wherein said drive motor is in a ready-to-operate state only when at least one of said switches is actuated, further wherein a first one of said switches is disposed on said discharge opening, and wherein a second one of said switches is disposed on said intake opening.

2. A blower according to claim 1, wherein said first switch and said second switch are integrated on a common switch element that is provided with two switch contacts.

3. A blower according to claim 1, wherein said first switch and said second switch are adapted to be opened in an actuated state.

4. A blower according to claim 1, wherein said first switch and said second switch are connected in parallel.

5. A blower according to claim 1, wherein said first switch and said second switch are adapted to be closed in an actuated state.

6. A blower according to claim 1, wherein said first switch and said second switch are connected in series.

7. A blower according to claim 1, wherein said drive motor is an external, auto-ignition internal combustion engine having an ignition device, and wherein at least one switch, in a closed state, is adapted to connect said ignition device with a ground wire.

8. A blower according to claim 1, wherein said drive motor is an electric motor.

9. A blower according to claim 1, wherein at least one switch is a micro switch.

10. A blower according to claim 1, wherein two attachments are provided, further wherein a first one of said attachments is an intake grille for said intake opening, and wherein a second one of said attachments is a discharge tube for said discharge opening.

11. A blower according to claim 1, wherein two attachments are provided, further wherein a first one of said attachments is a suction tube for said intake opening, and wherein a second one of said attachments is a withdrawal tube for said discharge opening.

12. A blower according to claim 1, wherein at least one attachment is adapted to be connected to said housing via a rotation of a securement element of said attachment about an axis of rotation that extends transverse to said one opening.

13. A blower according to claim 1, wherein said at least one attachment is provided with an actuating element for actuation of said at least one switch.

14. A blower according to claim 13, wherein said actuating element is an outwardly extending actuating arm that when said attachment is secured to said one opening is adapted to actuate said at least one switch.

15. A blower according to claim 1, wherein a common switch housing is provided for both of said switches, further wherein said switch housing is provided with a support on which said switches are held, and wherein said switch housing is provided with a cover that is connected with said support via at least one latching or snap connection.

16. A manually guided blower, comprising:

a housing in which is disposed a drive motor for rotatingly driving an impeller, wherein said impeller is adapted to draw in an air stream via an intake opening of said housing and is adapted to convey the air stream through a discharge opening of said housing;

at least one attachment that is adapted to be detachably connected to said housing in the vicinity of one of said intake opening and said discharge opening; and at least one switch, wherein when said at least one attachment is secured to said one opening, said at least one switch of said switches is actuated, wherein said drive motor is in a ready-to-operate state only when said at least one switch of said switches is actuated, and wherein at least one switch is provided with a contact plate and a torsion spring that cooperates with said contact plate.

17. A blower according to claim 16, wherein a common torsion spring is provided for two switches, further wherein said torsion spring has a first leg and a second leg, further wherein said first leg, together with said contact plate, forms a first one of said switches, and wherein said second leg, together with said contact plate, forms a second one of said switches.

18. A blower according to claim 16, wherein two switches are provided, further wherein two torsion springs are provided, further wherein a first one of said torsion springs, together with said contact plate, forms a first one of said switches, and wherein a second one of said torsion springs, together with said contact plate, forms a second one of said switches.

19. A blower according to claim 16, wherein at least one torsion spring is biased into a closed state of said switch.

* * * * *